United States Patent Office 3,703,520
Patented Nov. 21, 1972

3,703,520
ADDUCTS OF ETHYLENE CARBONATE AND TRIETHYLENEDIAMINE
Peter S. Carleton, Branford, and William J. Farrissey, Jr., North Branford, Conn., assignors to The Upjohn Company, Kalamazoo, Mich.
No Drawing. Filed Oct. 6, 1970, Ser. No. 78,567
Int. Cl. C07d 51/70
U.S. Cl. 260—268 T  3 Claims

ABSTRACT OF THE DISCLOSURE

Novel catalytic compositions are disclosed which are the monohydrate and unhydrated adducts respectively of substantially equimolar proportions of ethylene carbonate and triethylenediamine. The adducts are useful organic isocyanate trimerization catalysts.

BACKGROUND OF THE INVENTION

(1) Field of the invention

This invention relates to novel adducts of an alkylene carbonate and an aliphatic tertiary amine, and more particularly is concerned with adducts of ethylene carbonate and triethylene-diamine and with methods for their preparation.

(2) Prior art

Epoxide-tertiary amine adducts are known and have been recognized as isocyanate trimerization catalysts; see for example U.S. Patent 3,168,483. The epoxide-tertiary amine adducts are, however, unstable, decomposing so rapidly that to be utilized in, for example, a polyisocyanurate foam system, the epoxide must be added as a separate component apart from the amine component. The ethylene carbonate-triethylenediamine adducts, which are the novel compositions of this invention, however, are stable for long periods of time, allowing greater versatility in handling and utilization in a wider variety of foam systems.

SUMMARY OF THE INVENTION

The invention comprises a new composition of matter which comprises a member selected from the group consisting of (a) the equimolar adduct of ethylene carbonate and triethylenediamine and (b) the monohydrate thereof.

The compositions of the invention are useful catalysts for trimerizing organic isocyanates.

DETAILED DESCRIPTION OF THE INVENTION

The unhydrated adduct can be readily prepared by admixing the reactants, under anhydrous conditions, using conventional equipment and techniques. For example, equimolar proportions of dried triethylenediamine and ethylene carbonate are mixed by stirring under anhydrous conditions. This can be accomplished by standard techniques of excluding moisture laden atmospheres, such as by sealing the reaction vessel with minimal quantity of enclosed moist air, or by mixing under an atmosphere of inert dry gas such as nitrogen. The desired 1:1 complex of ethylene carbonate and triethylenediamine separates from the reaction mixture as a solid, which is readily isolated by filtration, centrifugation and like techniques. The monohydrate is conveniently prepared in the same manner as the unhydrated adduct, except that the reaction is carried out in the presence of water and precautions to maintain anhydrous conditions, such as drying reactants and excluding moisture from the reaction atmosphere, need not be employed.

Although not required in the above reactions, inert organic solvents can be employed advantageously to solubilize the ethylene carbonate and triethylenediamine and to assist admixture. Inert organic solvents are those which do not themselves enter into the reaction, such as, for example, benzene, toluene, tetrahydrofuran, dioxan, dimethylsulfoxide, dimethylformamide, dimethylacetamide, hexamethylphosphoramide, and the like.

The reaction proceeds at ambient temperatures, but the rate of reaction is advantageously increased by stirring and heating the reaction mixture between about 30° C. to about 100° C. The optimum speed of reaction is obtained by heating within a range of about 50° C. to 80° C. Completion of reaction is indicated by a cessation of adduct precipitation.

The adducts obtained as described above are usually in substantially pure form when they precipitate from the reaction mixture, and merely require washing with solvent and freeing from excess solvent. The solid material so obtained is readily handled and is stable for storage over prolonged periods of time. No special precautions need be taken in storing the monohydrate adduct, however the unhydrated adduct is hygroscopic and readily forms the monohydrate upon exposure to water or water vapor. When it is desired to store unhydrated adduct, therefore, precautions should be taken to exclude moisture by such means as vacuum packaging or like methods. The process of hydration is reversible, and so the unhydrated adduct can also be obtained by heating the monohydrated adduct under vacuum.

Both the monohydrated adduct and the non-hydrated adduct are effective catalysts for trimerizing organic isocyanates. Those organic isocyanates which are trimerized by the novel compositions of the invention include both aliphatic and aromatic isocyanates, including both mono and polyfunctional types. Examples of such organic isocyanates include phenylisocyanate, tolyl isocyanate, tolylene diisocyanate, including mixtures of the 2,4- and 2,6-isomers thereof, diphenylmethane-4,4'-diisocyanate, mixtures thereof containing polyisocyanates of higher functionality, and diphenylmethane-4,4'-diisocyanate modified in accordance with the process of U.S. Patent 3,384,653; tetramethylene diisocyanate, pentamethylene diisocyanate, hexamethylene diisocyanate, heptamethylene diisocyanate, octamethylene diisocyanate, nonamethylene diisocyanate, decamethylene diisocyanate, dodecamethylene diisocyanate, cyclohexane-1,4-diisocyanate, cyclohexane-1,3-diisocyanate, methylcyclohexane 2,4- and 2,6-diisocyanates, 1,3- and 1,4-bis (isocyanato-methyl) cyclohexane, 4,4'-diisocyanatodicyclohexylmethane, methylisocyanate, ethyl isocyanate, propyl isocyanate, isopropyl isocyanate, butyl isocyanate, amyl isocyanate, hexyl isocyanate, dodecyl isocyanate, cyclohexyl isocyanate, and the like.

The techniques of employing the novel compositions of the invention as catalysts in polymerization of organic isocyanates are those conventionally employed in the art, for example those methods using tertiary amine based catalyst compositions. These techniques are well known in the art as evidenced by descriptions for example in U.S. Patent 3,168,483, wherein tertiary amine-epoxide composition catalysts are used to polymerize isocyanates. In general, the method comprises adding catalytic quantities of catalyst to the isocyanate or an isocyanate component of a polymer forming composition. The catalyst can, if desired, be pre-mixed with other components of the polymer composition, such as foaming agents, surfactants, emulsifiers, blowing agents and the like. The components of the formulation are rapidly mixed and dispensed to a mold where polymerization occurs, generally at ambient temperatures. The amount of the catalyst generally employed, for example in a polyisocyanurate foam system, is about 0.5 to about 5 parts per 100 parts isocyanate.

The following examples describe the manner and process of making and using the invention, and set forth the best mode contemplated by the inventors of carrying out the invention, but are not to be construed as limiting.

EXAMPLE 1

To a dry 50 ml. Erlenmeyer flask there is added 25 ml. of dimethyl sulfoxide previously dried over molecular sieves, 2.2 gms. (0.025 mole) of ethylene carbonate and 2.8 gms. (0.025 mole) of freshly sublimed triethylenediamine (1,4 - diazabicyclo[2,2,2]octane, DABCO, The Houdry Process and Chemical Co.). The flask is tightly stoppered and allowed to stand at room temperature. A white crystalline precipitate forms and after about 20 hours, precipitation appears to have ceased. The white solid is filtered out of the reaction mixture, washed with dried benzene and dried on a suction filter. Upon further drying in an oven at 56° C. for 1 hour under vacuum, there is obtained 2.51 gm. (50% theory) of the equimolar adduct of ethylene carbonate and triethylene diamine. The product identity is confirmed by microanalytic analysis as follows:

Calculated for $C_9H_{16}N_2O_3$ (percent): C, 54.05; H, 8.00; N, 14.01. Found (percent): C, 53.48; H, 8.56; N, 13.30.

EXAMPLE 2

To a 50 ml. Erlenmeyer flask containing 25 ml. of dimethylformamide there is added 2.2 gms. (0.025 mole) of ethylene carbonate, 2.8 gms. (0.025 mole) of triethylenediamine (DABCO, supra) and 0.45 gm. (0.025 mole) of water. The flask is stoppered and allowed to stand at room temperature. A white crystalline precipitate forms, and, after 20 hours precipitation appears to cease. The white solid material is filtered out of the reaction mixture, washed with benzene and dried on a suction filter. The product is 1.05 gms. (21% theory) of the monohydrate of an equimolar adduct of ethylene carbonate and triethylenediamine. The product identity is confirmed by microanalytical analysis as follows:

Calculated for $C_9H_{18}N_2O_4$ (percent): C, 49.50; H, 8.24; N, 12.81. Found (percent): C, 49.60; H, 8.72; N, 12.99.

EXAMPLE 3

In a reactor vessel there is charged 4.4 gms. (0.050 mole) ethylene carbonate, 5.6 gms. (0.050 mole) triethylenediamine (DABCO, supra) and 50 ml. benzene. The mixture is stirred briefly and heated circa 80° C. for about 2 hours. During this period, the mixture becomes cloudy and then an amber colored gum precipitates. The precipitate is separated by filtration while warm. Upon cooling, the precipitate solidifies, forming white crystals.

The white crystals obtained are washed with benzene and chloroform, and then dried on a suction filter to remove solvent. The dried product, is a monohydrate of the equimolar adduct of ethylene carbonate and triethylenediamine. The above preparation was carried out without any attempt to maintain anhydrous conditions. Upon heating between 165° C. to 170° C. the product becomes a liquid with evolution of carbon dioxide. Identity of the adduct is confirmed by microanalytical analysis as follows:

Calculated for $C_9H_{16}N_2O_3 \cdot H_2O$ (percent): C, 49.5; H, 8.24; N, 12.81. Found (percent): C, 50.1; H, 8.1; N, 12.1.

The adduct is further characterized by infrared analysis which shows a broad carbonyl band $6.02\mu$ and a hydroxyl band at $3\mu$. Nuclear Magnetic Resonance Analysis ($D_2O$) shows two multiplets at $\delta 4.1$ (2H) and $\delta 3.46$ (14H).

The product of this example remains stable for over nine months while stored at room temperature in a capped container.

EXAMPLE 4

A 100 ml. volumetric flask equipped with a magnetic stirrer is charged with 10 ml. of 6.0 M phenyl isocyanate solution in benzene, 0.60 g. of the adduct obtained in Example 3, and sufficient dry benzene to bring the volume to 100.0 ml. The temperature is maintained at 27.5±0.20° C. After 35 minutes an opacity develops, indicative of triphenyl isocyanurate formation, and carbon dioxide is evolved. The half-life of the reaction under these conditions is about 75 minutes, as determined by the disappearance of the N=C=O absorption band in the infrared at $4.4\mu$. The solid was filtered and dried, and found to have M.P. 276—280.5° C.

EXAMPLE 5

To 0.5 ml. phenyl isocyanate is added 2 mg. of adduct obtained in Example 3. Within 30 seconds, phenyl isocyanate trimer forms. Separated and dried the trimer is found to have a melting point of 276°–178° C.

EXAMPLE 6

To 0.5 ml. of modified methylene bis (phenylisocyanate) [isocyanate equivalent 143; prepared by heating methylene bis (phenylisocyanate) containing 94 percent 4,4' isomer and 6 percent 2,4' isomer with 3 percent by weight of triethylphosphate at 220° C. for 3 hours before cooling to approximately 70° C.] is added 10 mg. of adduct obtained in Example 3. Within 60 seconds the trimer of methylene bis (phenylisocyanate), a yellow, translucent glassy material is formed. Infrared analysis confirms the glassy product as the trimer of methylene bis (phenylisocyanate) by the presence of C=O band stretching at $5.8\mu$.

EXAMPLE 7

To each of two test tubes there is charged 0.5 ml. phenyl isocyanate. To the first, 2 mg. of unhydrated adduct as obtained in Example 1 is added. To the second test tube 2 mg. of monohydrate adduct as obtained in Example 2 is added. In each case, phenyl isocyanate trimer is formed within 30 seconds.

Similarly, using the above procedure but replacing phenyl isocyanate with n-butylisocyanate, toluene diisocyanate, and polymethylene polyphenylisocyanate, respectively the corresponding trimers are obtained.

We claim:

1. A composition of matter which consists of a member selected from the group consisting of (a) the equimolar adduct of ethylene carbonate and triethylenediamine and (b) the monohydrate thereof.

2. The composition of claim 1 wherein said member is the equimolar adduct of ethylene carbonate and triethylenediamine.

3. The composition of claim 1 wherein said member is the monohydrate of the equimolar adduct of ethylene carbonate and triethylenediamine.

References Cited

UNITED STATES PATENTS

| | | | |
|---|---|---|---|
| 3,084,140 | 4/1963 | Gurguilo et al. | 260—340.2 |
| 3,127,404 | 3/1964 | Mascioli | 260—268 T |
| 3,168,483 | 2/1965 | Beitchman et al. | 260—268 T |
| 3,502,706 | 3/1970 | Anderson et al. | 260—268 T |
| 3,145,227 | 8/1969 | Grayson et al. | 260—340.2 |

DONALD G. DAUS, Primary Examiner

U.S. Cl. X.R.

260—77.5 AC, 248 NS, 340.2, 454